March 28, 1939.　　　A. H. SPLITTSTOESSER　　　2,152,290
AGRICULTURAL IMPLEMENT ATTACHMENT
Filed Sept. 13, 1938　　　2 Sheets-Sheet 1
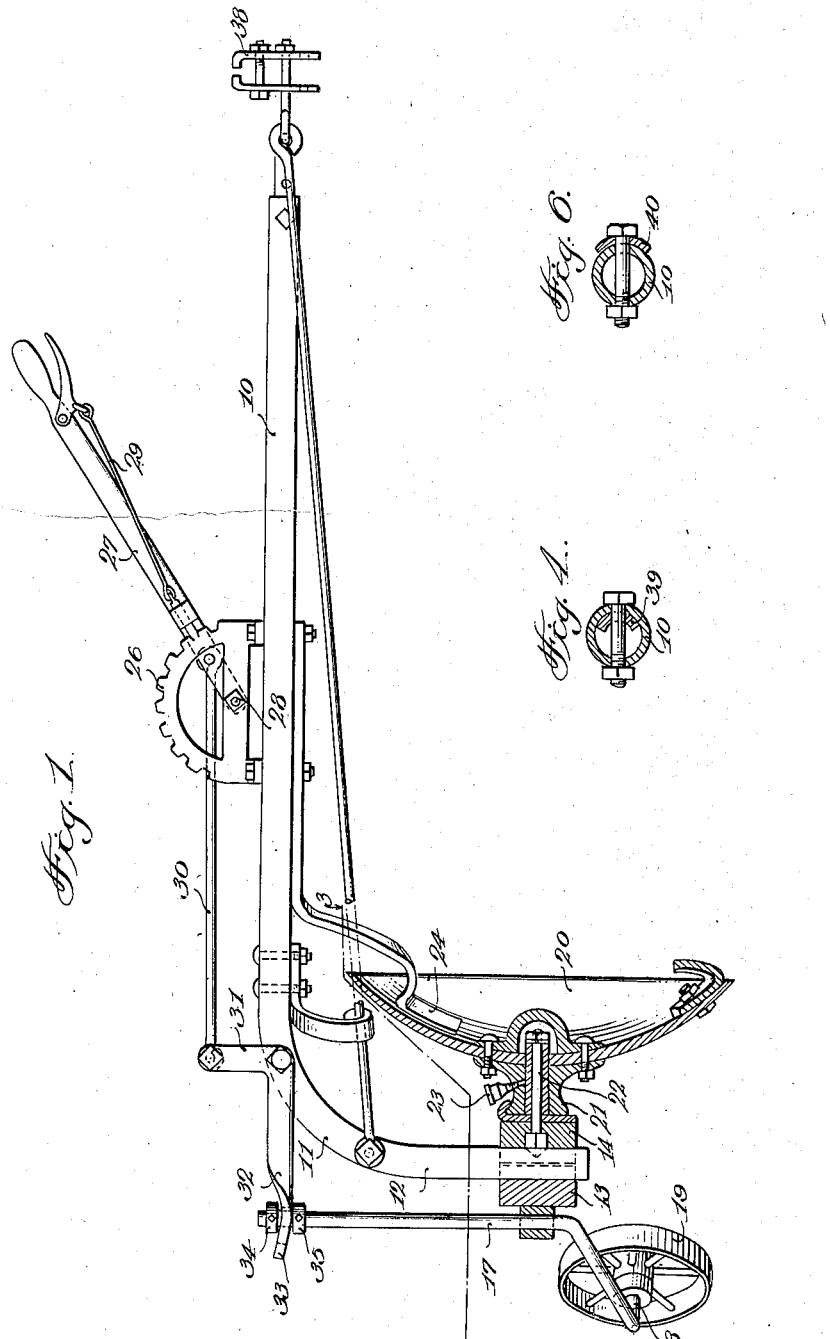
Albert H. Splittstoesser
INVENTOR
BY Victor J. Evans & Co.
ATTORNEYS March 28, 1939. A. H. SPLITTSTOESSER 2,152,290
AGRICULTURAL IMPLEMENT ATTACHMENT
Filed Sept. 13, 1938 2 Sheets-Sheet 2
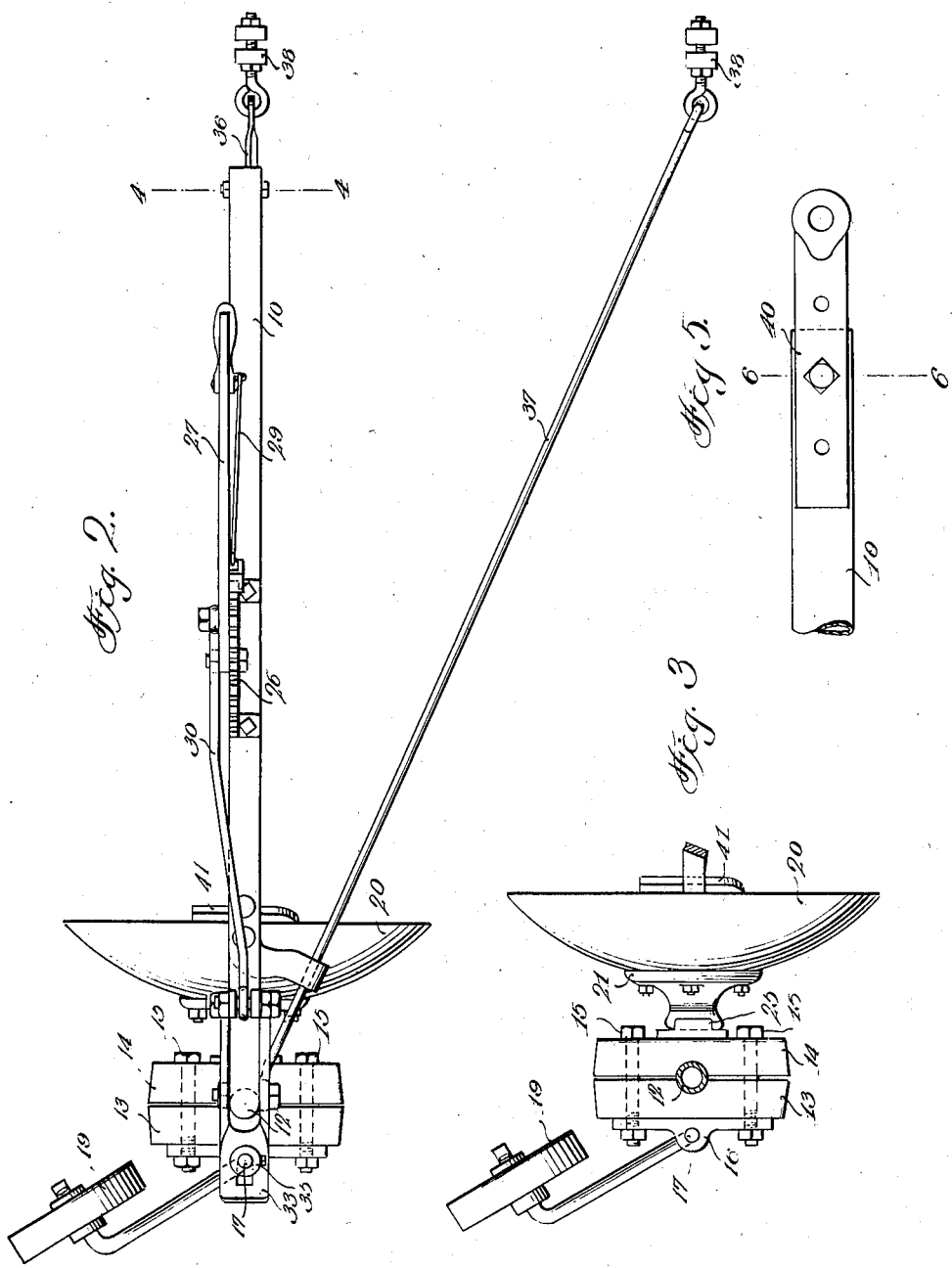
Albert H. Splittstoesser
INVENTOR
BY Victor J. Evans & Co.
ATTORNEYS Patented Mar. 28, 1939

2,152,290

UNITED STATES PATENT OFFICE 2,152,290

AGRICULTURAL IMPLEMENT ATTACHMENT

Albert H. Splittstoesser, Kulm, N. Dak.

Application September 13, 1938, Serial No. 229,764

4 Claims. (Cl. 97—6)

The invention relates to a ground working attachment for agriculture implements and more particularly to an agriculture implement attachment.

The primary object of the invention is the provision of an attachment of this character, wherein through the use of a disk susceptible of adjustment, it is susceptible for use with an agriculture implement or machine so that the soil after furrowing thereof can be acted upon for the opening up of the hollows between the hills and in this way conserving soil and water, the attachment being of novel construction and is susceptible for use on a plow adaptable for either summer or fall plowing.

Another object of the invention is the provision of an attachment of this character, wherein in the use thereof it enables the taking of a part of the ground from the first furrow, throwing it on the second furrow and thus effecting small ditches between the furrows and in this way keeping the water from flowing off of sloped land as well as the wasting away of the loose soil and relieving the soil from being blown from the top surface as well as stopping soil erosion.

A further object of the invention is the provision of an attachment of this character, wherein the same is susceptible of adjustment for regulating the ground working thereof in the formation of narrow or wide ditches in the soil.

A still further object of the invention is the provision of an attachment of this character, which is comparatively simple in its construction, being possessed of few parts yet strong, durable, thoroughly reliable and efficient in operation, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a side elevation partly in section of the attachment constructed in accordance with the invention and in ground working position.

Figure 2 is a top plan view.

Figure 3 is a sectional view taken on the line 3—3 of Figure 1 looking in the direction of the arrows.

Figure 4 is a sectional view on the line 4—4 of Figure 2.

Figure 5 is a fragmentary detail elevation of the coupling end of the draft frame or beam of the attachment.

Figure 6 is a sectional view on the line 6—6 of Figure 5.

Similar reference characters indicate corresponding parts throughout the several views in the drawings.

Referring to the drawings in detail, the attachment constituting the present invention comprises a draft frame, in this instance in the form of a beam 10, having aft thereof a downwardly curved bight 11 effecting a perpendicular standard 12 of circular formation in cross section, the beam, bight and standard being preferably tubular and embracing this standard 12 is a two-part or split block, one part being indicated at 13 and the other part at 14, respectively. These parts 13 and 14 have engaged therein fasteners, each in the form of a nut-carrying bolt 15 for the clamping of the parts about the standard 12, the fasteners being at opposite sides with respect to said standard and also secure in place an eye bearing 16 for accommodating the shank 17 of an axle 18 for a trailer wheel 19, the shank 17 being slidable through the eye of the bearing 16 and is extended vertically with the wheel 19 offset to the vertical.

Fore of the block including the parts 13 and 14 is a concavo convex disk 20 having a central hub 21 fitted on a stub axle 22 mounted in the part 14 of the block. This axle is lubricated from lubricant within an oil cup 23 fitting said hub 21 and the said disk 20 is rotatable on the axle 22.

Mounted on the beam 10 and disposed in working relation to the working side of the disk 20 is a dirt scraper 24.

The part 14 of the block has fixed thereto a hub coupling 25 engageable with the hub 21 to avoid the working off of the latter from the axle 22 in the rotation of said disk 20.

On the beam 10 is a toothed keeper segment 26 to which is pivoted a throw lever 27, being pivoted at 28, and this lever is equipped with a hand-released spring-set latch 29 coacting with the segment 26 so that the lever 27 can be held in adjusted position. The lever through a link 30 has connection with a bell crank lever 31, its long arm 32 terminating at the end 33 in an elongated slot for receiving the shank 17 and has loose play between abutment collars 34 and 35, respectively, carried upon said shank 17. This bell crank lever 32, on adjustment thereof, enables the raising and lowering of the wheel 19 and at the same time the shank 17, by reason of its mounting, swivels the wheel in the attachment. The lever 27 when latched holds the wheel 19 in its adjusted position.

The beam 10 at its fore end is equipped with a suitable hitch 36 for the fastening of the attachment to an agriculture implement such as a gang plow (not shown), the beam 10 being also associated with a drag hitch 37, which with the hitch 36 is provided with clamps 38 for convenient fastening of such hitches to the agriculture implement.

The trailer wheel 19 functions as a caster wheel, the hitch 36 being adjustably connected with the beam through the instrumentality of an inside fastener 39 or an outside fastener 40, the latter being shown in Figures 5 and 6 of the drawings.

By adjustment of the block, that is, the parts 13 and 14 thereof, the angular disposition of the disk 20 can be altered for servicing in ditches of narrower or wider extent.

The disk 20 near its peripheral edge is provided with a suitable clearance in which may be secured a depression-forming or pit-forming tool 41 which functions for creating depressions or pits in the soil as the disk rotates.

The attachment when coupled with an agriculture implement is drawn thereby, being advanced in rear of such agriculture implement, the hollow of the disk 20 being the working side thereof.

The operation of the device, in view of the construction hereinbefore set forth and that disclosed in the drawings, needs no delineation and such has been omitted for the purpose of brevity.

What is claimed is:

1. An attachment of the character described comprising a draft beam, a standard aft of said beam, a two-part block embracing said standard, means clamping the parts of the block when the latter is rotatably adjusted, a concavo convex disk journaled on said block, a bearing on said block, a trailer wheel having an axle shank swiveled in said bearing, a hitch for the beam, and means manually adjusted for raising and lowering the shank in said bearing.

2. An attachment of the character described comprising a draft beam, a standard aft of said beam, a two-part block embracing said standard, means clamping the parts of the block when the latter is rotatably adjusted, a concavo convex disk journaled on said block, a bearing on said block, a trailer wheel having an axle shank swiveled in said bearing, a hitch for the beam, means manually adjusted for raising and lowering the shank in said bearing, and means on the beam for the holding of the first-named means in adjusted position.

3. An attachment of the character described comprising a draft beam, a standard aft of said beam, a two-part block embracing said standard, means clamping the parts of the block when the latter is rotatably adjusted, a concavo convex disk journaled on said block, a bearing on said block, a trailer wheel having an axle shank swiveled in said bearing, a hitch for the beam, means manually adjusted for raising and lowering the shank in said bearing, means on the beam for the holding of the first-named means in adjusted position, and a depression tool fitted with said disk at the working side thereof.

4. An attachment of the character described comprising a draft beam, a standard aft of said beam, a two-part block embracing said standard, means clamping the parts of the block when the latter is rotatably adjusted, a concavo convex disk journaled on said block, a bearing on said block, a trailer wheel having an axle shank swiveled in said bearing, a hitch for the beam, means manually adjusted for raising and lowering the shank in said bearing, means on the beam for the holding of the first-named means in adjusted position, a depression tool fitted with said disk at the working side thereof, and a scraper on the beam and in working relation to said disk.

ALBERT H. SPLITTSTOESSER.